3,531,408
DRILLING FLUID

Jack H. Kolaian, Houston, Tex., assignor to Texaco Inc., New York, N.Y., a corporation of Delaware
No Drawing. Filed Apr. 25, 1967, Ser. No. 633,433
Int. Cl. C10m 3/34, 3/26
U.S. Cl. 252—8.5                                        11 Claims

ABSTRACT OF THE DISCLOSURE

An aqueous drilling fluid dispersant and a method of drilling wells using said drilling fluid which contains a substituted naphthalene as the dispersant, namely, 1-nitroso-2-hydroxy-3,6-disulfonaphthalene, 3,5-dihydroxy-2-carboxynaphthalene, the corresponding water soluble salts and mixtures of these compounds and salts.

---

This invention relates to a novel aqueous drilling fluid for drilling wells through sub-surface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc. in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a substituted naphthalene selected from the group consisting of 1-nitroso-2-hydroxy-3,6-disulfonaphthalene, 3,5-dihydroxy-2-carboxynaphthalene, the corresponding water soluble salts and mixtures thereof.

The term "substituted naphthalene" as used in the present specification and claims is intended to cover any of the above named naphthalene compounds or their water soluble salts or mixtures thereof.

More particularly, the substituted naphthalenes of the present invention include 1-nitroso-2-hydroxy-3,6-disulfonaphthalene, 3,5-dihydroxy-2-carboxynaphthalene, the corresponding alkali metal including ammonium salts of these compounds and mixtures of said compounds and/or their alkali metal salts.

It is surprising that these compounds are effective drilling fluid dispersants when other related compounds such as 1-nitroso-2-hydroxynaphthalene, 2-hydroxy-3,6-disulfonaphthalene and 1-hydroxy-2-nitroso-4-sulfonaphthalene, and their corresponding alkali metal salts are ineffective dispersants in aqueous drilling fluids.

It is known from the article appearing in Zhur. Priklad. Khem. 35, pages 638–647 (1962), "Organic Viscosity Reducers in Clay Solutions" by D. Tischenko and S. Fleisher (CA, 57, 2491g, 1962), that the ortho-dihydroxybenzenesulfonic acids, the ortho-dihydroxy-alpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

The substituted naphthalenes of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 pounds per barrel are economically unattractive and no improved results are obtained therewith. A preferred range for the substituted naphthalenes of the present invention is from about 0.25 to about 5 pounds per barrel of drilling fluid for most consistent results and efficiency.

The substituted naphthalenes employed in the present invention are known compounds and the manner of their preparation is known in the art.

In the tables, gel strength (gels) is reported as determined by a shearometer in accordance with the procedure in the American Petroleum Institute publication RP–29, results being expressed either as pounds/100 square feet or as time in seconds for a tube to settle in the mud (after the mud has stood for zero time and for 10 minutes). If it settles in more than 60 seconds, shear is reported as pounds per hundred square feet. Yield Point (YP) is calculated by subtracting the Plastic Viscosity (PV) from the Fann Viscosity reading at 300 r.p.m. Plastic Viscosity (PV) is obtained by calculation, subtracting the Fann reading at 300 r.p.m. from the 600 r.p.m. reading. Apparent Viscosity (AV) is equal to one half of the Fann Viscosity reading obtained at 600 r.p.m. The fluidity of a mud can be back calculated from these data, the results being expressed in Fann Viscosity at 600 r.p.m. and 300 r.p.m. for a direct reading viscosimeter.

The properties of the base muds are shown in the tables.

The test data set forth in the following tables indicate the surprising advantages of the substituted naphthalenes of the present invention are shown in the tablets. In each results of same in improving the dispersibility of drilling fluids.

Representative physical properties of drilling fluids both before and after addition of the substituted naphthalenes of the present invention are shown in the tables. In each example the amount of material or materials added to the base mud, if any, is shown, expressed in terms of pounds of material per barrel of drilling fluid.

TABLE I

| Ex. | Additional Additive, lbs. | Type Mud | Amount and Type Dispersant | PV | YP | Ap. Vis., Cpe. | Shearometer Gels, lb./100 ft.$^2$ 0$^1$ | 10$^1$ | pH | PM, cc. | API W.L., cc. | PF, cc. | Ca, p.p.m. | Time, hours |
|---|---|---|---|---|---|---|---|---|---|---|---|---|---|---|
| 1 | | LpH$^a$ | 0.5, A$^b$ | 10 | 20 | 20 | | | 9.5 | | | | | 0.25 |
|   | | | | 19 | 6 | 22 | | | 9.5 | | | | | 2 |
|   | | | | 19 | 4 | 21 | 0$^1$ | 0$^5$ | 9.4 | | 15.6 | | | 16 |
| 1a | | | 2.0, A | 11 | 4 | 13 | | | 9.5 | | | | | 0.25 |
|    | | | | 12 | 1 | 12.5 | | | 9.4 | | | | | 2 |
|    | | | | 15 | 2 | 16 | 0$^1$ | 0$^2$ | 9.3 | | 15.2 | | | 16 |
| 2 | 2.5 lime | ModSC$^c$ | 2.5B$^d$ | 11 | −3 | 9.5 | 0$^1$ | 0$^1$ | 12.3 | 7.6 | 64.8 | 1.7 | 680 | 16 |
|   |          |           |          |    |    | High Temperature Shear 105 | | | | | | | | |
| 3 | 3.0 lime+1.0 CaCl$_2$ | SC$^e$ | 3.5, B | 10 | 3 | 11.5 | 0$^1$ | 0$^3$ | 12.2 | 9.4 | 63.2 | 1.8 | 816 | 16 |
|   |                       |        |        |    |   | High Temperature Shear 100 | | | | | | | | |

$^a$ LpH=Low pH Mud.
$^b$ A=3,5-dihydroxy-2-carboxy-naphthalene.
$^c$ ModSC=Modified Shale Control Mud.
$^d$ B=1-nitroso-2-hydroxy-3,6-disulfonaphthalene.
$^e$ SC=Shale Control Mud.

The data in Table I above show that the substituted naphthalenes of the present invention are effective dispersants in low pH Modified Shale Control and Shale Control drilling fluids.

A modified shale control drilling fluid contains lime and caustic, if needed, but is free from any added water soluble calcium salt. A modified shale control drilling fluid containing lime and the novel dispersants of the present invention will provide the same beneficial results as achieved with the shale control drilling fluid of Weiss and Hall, U.S. 2,802,783, i.e. stabilizing and hardening the shale formations in contact therewith. This surprising result is accomplished in the absence of the water soluble salt employed by the Weiss and Hall patent to attain the necessary shale control chemistry needed to stabilize and harden the shale formations in contact therewith.

A shale control drilling fluid, more particularly described in Weiss and Hall, U.S. 2,802,783, and incorporated herein by reference, contains in addition to lime and the dispersant, sufficient of a water soluble calcium salt such as calcium chloride or sulfate, etc. to provide a calcium ion concentration of at least 200 p.p.m. therein and a pH in excess of about 11.

values at 0$^1$ and 10$^1$ show that these compounds are unsatisfactory drilling fluid dispersants.

I claim:
1. An aqueous drilling fluid containing clay solids dispersed therein and as the dispersant from about 0.1 to about 10 pounds per barrel of drilling fluid of a substituted naphthalene selected from the group consisting of 1-nitroso - 2 - hydroxy-3,6-disulfonaphthalene, 3,5-dihydroxy - 2 carboxynaphthalene, the corresponding water soluble alkali metal and ammonium salts and mixtures thereof.
2. An aqueous drilling fluid as claimed in claim 1 wherein the substituted naphthalene is 1-nitroso - 2 - hydroxy-3,6-disulfonaphthalene.
3. An aqueous drilling fluid as claimed in claim 2 wherein the substituted naphthalene is a sodium salt of 1-nitroso-2-hydroxy-3,6-disulfonaphthalene.
4. An aqueous drilling fluid as claimed in claim 1 wherein the substituted naphthalene is 3,5-dihydroxy-2-carboxynaphthalene.
5. An aqueous drilling fluid as claimed in claim 4 wherein the substituted naphthalene is the sodium salt of 3,5-dihydroxy-2-carboxynaphthalene.
6. An aqueous drilling fluid as claimed in claim 1 where-

TABLE II

| Ex. | Additional Additive, lbs. | Type Mud | Amount and Type Dispersant | PV | YP | Ap. Vis., Cpe. | Shearometer Gels, lb./100 ft.$^2$ 0$^1$ | 10$^1$ | pH | PM, cc. | API W.L., cc. | PF, cc. | Ca, p.p.m. | Time, hours |
|---|---|---|---|---|---|---|---|---|---|---|---|---|---|---|
| 4 | | LpH$^a$ | 0.5, C$^b$ | 10 | 26 | | | | | | | | | 2 |
|   | | | | 19 | 16 | 27 | 3.2 | 6.7 | 9.6 | | 16.4 | | | 16 |
| 4a | | | 2.0, C | 19 | 9 | | | | | | | | | 2 |
|    | | | | 20 | 15 | 27.5 | 3.5 | 6.7 | 9.5 | | 17.0 | | | 16 |
| 5 | | LpH | 0.5, D$^c$ | 12 | 36 | 30 | | | 9.5 | | | | | 0.25 |
|   | | | | 13 | 34 | 30 | | | 9.4 | | | | | 2 |
|   | | | | 15 | 37 | 33.5 | 26 | 45 | 9.4 | | 15.3 | | | 16 |
| 5a | | | 1.0, D | 6 | 47 | 29.5 | | | 9.6 | | | | | 0.25 |
|    | | | | 7 | 43 | 28.5 | | | 9.3 | | | | | 2 |
|    | | | | 14 | 40 | 34 | 26 | 45 | 9.4 | | 15.4 | | | 16 |
|    | | | 1.5, D | 12 | 26 | 25 | | | 9.7 | | | | | 0.25 |
|    | | | | 10 | 28 | 24 | | | 9.6 | | | | | 2 |
|    | | | | 10 | 24 | 22 | 13 | 19 | 9.2 | | 16 | | | 16 |
| 6 | | LpH | 0.5, E$^d$ | 12 | 23 | | | | | | | | | 2 |
|   | | | | 17 | 17 | 25.5 | 4.6 | 8.6 | 9.4 | | 16.2 | | | 16 |
| 6a | | | 2.0, E | 9 | 26 | | | | | | | | | 2 |
|    | | | | 13 | 20 | 23 | 7 | 14 | 9.7 | | 16.2 | | | 16 |

$^a$ LpH=Low pH Mud.
$^b$ C=1-nitroso-2-hydroxynaphthalene.
$^c$ D=2-hydroxy-3,6-disulfonaphthalene.
$^d$ E=1-hydroxy-2-nitroso-4-sulfonaphthalene.

The data in Table II above show that 1-nitroso-2-hydroxynaphthalene, 2 - hydroxy-3,6-disulfonaphthalene and 1-hydroxy-2-nitroso - 4 - sulfonaphthalene are ineffective dispersants in low pH drilling fluids as is evidenced by the high Yield Point and Apparent Viscosity values obtained with these compounds. In addition, the high gel in the substituted naphthalene is present in an amount of from 0.25 to 5 pounds per barrel.

7. In a method of drilling wells wherein a drilling fluid is passed through the well in contact with earth formations during the drilling operation, the improvement which comprises contacting said earth formations with an aqueous drilling fluid containing clay solids dispersed therein as the dispersant at least 0.1 pound per barrel of drilling fluid of a substituted naphthalene selecting from the group consisting of 1-nitroso - 2 - hydroxy-3,6-disulfonaphthalene, 3,5-dihydroxy-2-carboxynaphthalene, the corresponding alkali metal and ammonium water soluble salts and mixtures thereof.

8. A method as claimed in claim 7 wherein the substituted naphthalene is 1-nitroso - 2 - hydroxy-3,6-disulfonaphthalene.

9. A method as claimed in claim 8 wherein the substituted naphthalene is a sodium salt of 1-nitroso - 2 - hydroxy-3,6-disulfonaphthalene.

10. A method as claimed in claim 7 wherein the substituted naphthalene is 3,5 - dihydroxy-2-carboxynaphthalene.

11. A method as claimed in claim 10 wherein the substituted naphthalene is the sodium salt of 3,5 - dihydroxy-2-carboxynaphthalene.

References Cited
UNITED STATES PATENTS

| | | | |
|---|---|---|---|
| 1,999,766 | 4/1935 | Lawton et al. | 252—8.5 |
| 3,051,750 | 8/1962 | Dettwyler | 260—512 |
| 3,293,177 | 12/1966 | Stratton et al. | 252—8.5 |

OTHER REFERENCES

Rogers, Composition and Properties of Oil Well Drilling Fluids, second edition, published 1953 by Gulf Pub. Co. of Houston, Tex., pp. 310 and 319 to 322.

HERBERT B. GUYNN, Primary Examiner

U.S. Cl. X.R.

252—353, 356

PO-1050
(5/69)

UNITED STATES PATENT OFFICE
CERTIFICATE OF CORRECTION

Patent No. 3,531,408      Dated September 29, 1970

Inventor(s)   Jack H. Kolaian

It is certified that error appears in the above-identified patent and that said Letters Patent are hereby corrected as shown below:

Column 2, lines 64-66, change "are shown in the tablets. In each results of same in improving the dispersibility of drilling fluids" to read --and demonstrate the beneficial results of same in improving the dispersibility of drilling fluids--. In Table I, column headed Type Mud, line #1 "$LpH^2$" should read --$LpH^a$--. In Table II, column headed Type Mud, line #4 "$LpH^2$" should read --$LpH^a$--. Claim 7, line 7, "selecting" should read --selected--.

SIGNED AND SEALED
MAR 16 1971

(SEAL)
Attest:

Edward M. Fletcher, Jr.
Attesting Officer

WILLIAM E. SCHUYLER, JR.
Commissioner of Patents